United States Patent [19]

Pitt et al.

[11] Patent Number: 5,161,520

[45] Date of Patent: Nov. 10, 1992

[54] SOLAR-POWERED STEAM GENERATION SYSTEM

[76] Inventors: Roger Pitt, 10 Ambler Rd., Westport, Conn. 06880; Richard Clowes, 20 Waterside #6J, New York, N.Y. 10010

[21] Appl. No.: 749,147

[22] Filed: Aug. 23, 1991

[51] Int. Cl.⁵ ................................................ F24J 2/44
[52] U.S. Cl. ................................ 126/434; 126/443; 126/448
[58] Field of Search ............. 126/434, 435, 443, 448, 126/433, 417; 165/104.21; 60/641.8

[56] References Cited

U.S. PATENT DOCUMENTS

| | | | |
|---|---|---|---|
| 4,237,866 | 12/1980 | Rush | 126/434 |
| 4,284,066 | 8/1981 | Brow | 126/434 |
| 4,299,203 | 11/1981 | Skopp | 126/434 |
| 4,437,456 | 3/1984 | Merrigan | 126/434 |

Primary Examiner—James C. Yeung
Attorney, Agent, or Firm—Handal & Morofsky

[57] ABSTRACT

This invention relates to a Solar-Powered Steam Generator which is particularly useful for pumping ground water in poor and rural areas. Steam is raised in a boiler heated by hot fluid directly or indirectly. Improvements in management of the fluid flow and manifold design are provided.

12 Claims, 5 Drawing Sheets

SOLAR-POWERED STEAM GENERATION SYSTEM

TECHNICAL FIELD

This invention relates to solar-powered steam generation equipment which provides a head of steam that can usefully be applied to practical tasks such, for example, as raising water.

BACKGROUND

There is a need for self-contained water-pumping systems that can raise well water to the surface using collected radiant solar energy as a primary energy source so as to be able to function for long periods with little, if any, in the way of external input of supplies, including fuel. Such a pump is desirable in remote or poor areas where electricity or hydrocarbon fuels, for example diesel oil, are expensive or unavailable. To meet the needs of these areas, such a water-pumping system should require little, if any maintenance and, unlike internal combustion engines, have few demands for replacement parts.

A broad objective of the present invention is to provide an improved solar-powered steam-generation system which is particularly applicable for use in the poorer, drier countries of the world, for example, in much of Africa, for tasks including pumping water for drinking and personal use or for irrigation. A further objective is to provide a water-pumping system driven by such a generator which system is economical, self-contained low maintenance and does not require a supply of fuel. It is particularly challenging to provide a system which while being very low maintenance has a low enough capital cost to be affordable. In 1991 U.S. dollars, this capital cost should be of the order of a dollar per gallon per day on a sustainable basis although fifty cents per gallon per day for a capacity of the order of tens of thousand of gallons per day is a more desirable target.

The art is replete with proposals for solar-powered water pumps, most of them overly complex, which are either technically inadequate, typically because they fail to provide effective solar energy collection means and therefore fail to maintain sufficient temperature gradients, or are hopelessly expensive, or both. It is doubtful whether most of the prior art systems can pump worthwhile quantities of water on a continuous basis, and none is believed to do so with adequate economy.

Other possible uses of the raised steam include water-heating, for example for cooking, and electricity generation. However, the efficiency of such applications is questionable with existing technology, and the preferred application is for raising or pumping water as this has already been shown to be practicable in an economical manner.

The present invention is concerned with systems that are commercially feasible for purchase by communities such as villages of several hundreds or thousands of people. This imposes considerable constraints on the technology that can be used. Put simply, such systems must be capable of pumping a lot of water consistently with very low running costs and for a modest capital investment. The capital cost rules out technologies such as focussing reflector arrays and photovoltaic collectors, which have expensive components and usually require tracking means to follow the sun. Furthermore, currently known such systems tend to require expensive maintenance components. They are too "high-tech" to be suitable as the primary energy source for the systems of the present invention, although small-scale structures, such as photovoltaic panels may have application for low-capacity control or subsidiary purposes where a higher potential energy than the steam-generation means provides, is required.

Similarly, running and maintenance costs and skills rule out diesel or other internal combustion engine generators.

Moan U.S. Pat. No. 4,346,694 describes a system in which an array of passive solar-energy collection elements heat air in a plurality of streams that are consolidated in an insulated manifold to provide an open-circuit hot air stream. No use is described or suggested for the low-pressure hot air output of the Moan system. Preferred collector elements are double-walled evacuated glass tubes within which distribution tubes provide for two-way air flow and the Moan system offers good collection efficiency combined with moderate capital and low maintenance costs.

In a disclosure entitled "Solar Powered Water Pump" purportedly filed in the United States Patent and Trademark Office on Apr. 1, 1991 with rights accruing to WorldWater Inc. (hereinafter called "the WorldWater text"), inventor(s) unknown, there is described a water-pumping system broadly designed to meet the foregoing objectives, which system uses solar-generated hot air, produced, for example, with Moan's collector array, to raise steam. In an important disclosure, the WorldWater text uses the head of steam to drive a diaphragm pump for pumping water. Surprisingly good results are obtainable, with good water deliveries in modest solar radiation conditions. The disclosed system is economical and efficient with low maintenance costs.

SUMMARY OF THE INVENTION

A preferred objective of the present invention is to provide a solar-powered steam generation system applicable to water-pumping, which system is capable of generating steam with improved efficiency than has heretofore been possible.

Another objective is to provide a solar-powered steam generation system which has greater utility and convenience for the end user.

Yet another objective is to provide a solar-powered steam generation system which can be manufactured to be adaptable to different requirements.

A particular objective is to provide a solar-powered steam generation system employing solar-generated hot air to raise steam in a boiler which has improved steam-generating efficiency.

Another objective is to provide an improved water pump employing such a solar-powered steam generation system Accordingly, in one aspect, the invention provides a solar-powered steam-generation system comprising:
  a) an array of solar-energy collector means adapted to provide a directed flow of solar-heated fluid from dispersed solar-energy absorption zones to an energy collection center;
  b) a steam-raising boiler driven by heat from said directed fluid flows;
  c) manifold means at said energy-collection center to receive and collect said heated fluid flows and transfer heat therefrom to the boiler; and d) a collector tube for each heated fluid flow to guide it to the manifold, said collector tubes and manifold means being designed for the manifold to support the tubes;

wherein said manifold means includes one or more manifold blocks each connectable one to the other and each adapted to support one or more collector tubes and channel its output to the boiler.

Preferably, the boiler includes a water-carrying heat exchanger disposed substantially within the manifold means to receive heat from said heated fluid flows for boiling water therein.

In another aspect, the invention provides a solar-powered steam-generation system comprising:
a) an array of solar-energy collector means adapted to provide a directed flow of solar-heated fluid from dispersed solar-energy absorption zones to an energy collection center;
b) a steam-raising boiler driven by heat from said directed fluid flows;
c) manifold means at said energy-collection center to receive and collect said heated fluid flows and transfer heat therefrom to the boiler; and
d) a collector tube for each heated fluid flow to guide it to the manifold;

wherein substantially all said collector tubes are disposed and constructed so that natural convection promotes the delivery of heated fluid towards the boiler by causing said heated air to rise upwardly in the tubes. Preferably, all or substantially all the collector tubes depend downwardly from said manifold means.

In a further aspect the invention provides a solar-powered steam-generation system comprising:
a) an array of solar-energy collector means adapted to provide a directed flow of solar-heated fluid from dispersed solar-energy absorption zones to an energy collection center;
b) a steam-raising boiler driven by heat from said directed fluid flows;
c) manifold means at said energy-collection center to receive and collect said heated fluid flows and transfer heat therefrom to the boiler;
d) water-carrying heat exchanger means disposed substantially within the manifold means to receive heat from said heated fluid flows for boiling water therein;
e) a hot air chamber above said manifold means; and
f) a cold air chamber below said heat exchanger means;

wherein heated air recirculates in said manifold means to deliver heat from said fluid flows to said heat exchanger and wherein the manifold and heat-exchanger means are constructed, arranged and adapted to operate so that said recirculating air has a flow path directing substantially all the air downwardly over said heat exchanger from said hot air chamber to said cold air chamber whereby cooling in said heat exchanger serves to draw the air downwardly to promote convective flow.

The invention also provides a solar-powered steam-generation system comprising:
a) an array of solar-energy collector means adapted to provide a directed flow of solar-heated fluid from dispersed solar-energy absorption zones to an energy collection center;
b) a steam-raising boiler driven by heat from said directed fluid flows;
c) manifold means at said energy-collection center to receive and collect said heated fluid flows and transfer heat therefrom to the boiler; and wherein heated air recirculates in said manifold means to deliver heat from said fluid flows to said boiler and wherein the system further comprises passively acting airflow-enhancing structures to promote natural convective air flow.

Said heated fluid flow and said air flow are preferably driven by natural convection without intervention from energy consuming powered air-flow generating devices. The collector means can comprise a plurality of collector tubes, each having an open-ended delivery tube therein, both said tubes opening into said manifold and said heated fluid comprises air recirculating through said tubes and said manifold, and wherein said delivery tube is swingably mounted at the manifold end thereof so as to lie away from the sun within said collector tube when mounted for use.

With advantage, the solar-powered steam-generation system according to claim 6 wherein said airflow-enhancing structures comprise shaping of internal surfaces to promote streamline air flow.

The airflow-enhancing structures can also, or alternatively, comprise air vent means openable to atmosphere to prime the air flow.

BRIEF DESCRIPTION OF THE DRAWINGS

Some embodiments of the invention will now be described by way of example, and without limitation, with reference to the accompanying drawings, in which:

Referring to FIG. 1 of the drawings, the solar-powered steam generator shown comprises a modular manifold 10 from which depend an array of parallel solar-energy collector tubes 12 or other elongated collector elements. The manifold 10 is connected to one or more water supply tubes 14 and one or more steam tubes 16 for a water-to-steam boiler, not shown, in close heat-communication with the manifold 10 and mechanically associated with it to extend longitudinally across the ends of the array of collector tubes 12 in a direction that will be referred to herein as the boiler direction which is disposed at a boiler angle to a horizontal plane.

Figure 1:
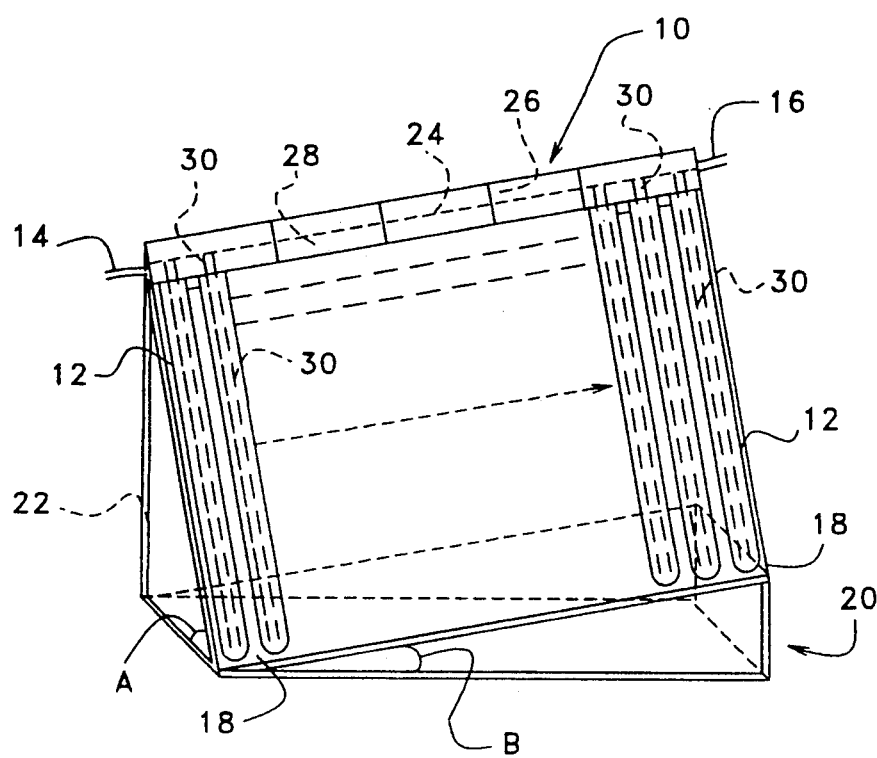
FIG. 1 of the drawings is a front elevational view of a solar-powered steam generator assembly according to the invention.

It should however be understood that with the variety of possible constructions in which the invention can be realized, the boiler angle refers in a general manner to a disposition of the boiler as it lies near the ends of the collector tubes 12 to receive heat from them. In some constructions there will be a clear-cut line representing the boiler angle. In others the line may be less obvious, but its disposition can have an important impact on steam raising, as will be described herein This steam-generating assembly is supported by any convenient means for example a frame comprising a generally rectangular collector panel 18 supported on a ramp 20 by means of an L-brace 22. The L-brace 22 carries the collector panel 18 canted at an angle A selected to catch the sun according to the latitude and season. If desired, collector panel 18 can be provided with a diffusely reflective surface to enhance radiation delivery to the collector tubes 12 which can then be supported somewhat above that surface.

Preferably, angle A is adjustable, for example, by varying the height of an upright 24 of the L-brace 22, the collector panel 18 being hinged to the ramp 20. Using perforated angle iron for the L-brace 22, or an equivalent construction, adjustability is readily achieved by peg and socket means. Angle A will preferably be selected to provide an effective compromise between the varying angles of the sun throughout the day, being angled to collect a higher percentage of morning and evening radiation rather than being optimized for mid-day radiation which is usually more than adequate. Clearly such balancing is more important at greater latitudes and during winter when less solar radiation is received.

Typical values for A are from 20 to 60 degrees, particularly from 30 to 50 degrees Increasing the spacing between the collector tubes 12, will increase the day length of full exposure of the tubes to full radiation, i.e. increase the time between the decline and approach of shadowing between adjacent tubes. A full tube width between each tube should provide about eight hours direct exposure. Clearly, too large a spacing will render the system unduly cumbersome. If desired, the direct exposure time can be increased by simple tracking means, such as a crude turntable or other means permitting the array of collector tubes to be rotated or swung. Such tracking means does not need the expense and sophistication of reflector tracking which needs to be continuous. For the present system, it may be adequate to move or swing the array two or three times a day.

As shown, manifold 10 is internally divided by a longitudinal baffle 24 into a hot upper chamber or chambers 26 and a cool lower chamber or chambers 28. Heat delivery pipes 30, one in each collector tube 12 output into hot chamber 26. Preferably, manifold 10 is efficiently heat insulated.

As will be described, manifold 10 preferably is included in a hot air circuit which is carefully designed for optimal air flow, but in a modified construction air circulation within the manifold can be eliminated. This is achieved by having the upper ends of the heat delivery pipes 30 in direct conductive thermal contact with the boiler which is conveniently located within the manifold 10 for compactness and heat conservation. For example, the upper ends of the heat delivery tubes 30 can nest in sockets of an expanded boiler configuration. In a more elaborate configuration, these sockets have internal heat exchanger means, such as vanes, within the boiler to draw heat.

The collector tubes 12 are, as shown, preferably double walled so that heat can be convectively transported by a fluid which is protected from direct contact with a cold external wall because the effect of ambient winds on the outer surfaces of the collector tubes 12 may be quite significant. Delivery tubes 30 are thus further protected from heat losses by being substantially contained within the collector tubes 12. One efficient and preferred embodiment of collector tube 12 is a double-walled evacuated glass tube provided with internal heat-absorbing surfaces, such as the collector elements 16 of Moan U.S. Pat. No. 4,346,694, the details of which are described with reference to FIG. 3 of that patent. Such collector tubes can be arranged with their inner heat delivery pipes 30 outputting to the hot chamber 26 of the manifold 10, as already described and shown, and with the outer tubes 12 communicating with the lower cool manifold chamber 28. In the embodiment shown in the accompanying drawings, which may employ a considerable number of collector tubes 30, such as 20 or 30 or more, all the tubes 12 and the pipes 30 communicate with a cool chamber 28 or a hot chamber 26, respectively.

Where the manifold 10 and boiler are adapted for direct conductive heating of water in the boiler by heat from the upper hot ends of the collector tubes 12 and the collector tubes 12 have an open-ended construction housing open-ended delivery tubes 30 such, for example as shown by Moan, then the open upper ends of each collector tube will need to be substantially closed to be effective. Furthermore, return means such as deflectors or forced air circulation, will be desirable to guide return air flow back down between each outer collector tube 12 and inner delivery tube 30. In the embodiment shown in FIGS. 4 and 5 this is achieved by capping and providing heat conductor means to transmit heat from the hot caps, so provided, to the boiler. As will be described, convection means can also be used. Closable air vents or bleeds on the upper surfaces of the tubes can assist air flow, for example by priming, if appropriately operated.

Although possibly employing similar collector elements, this arrangement of the collector tubes 12 is clearly distinguished from Moan's claimed invention which is concerned with a staggered, double array of elements disposed on opposite sides of the manifold. The array shown in FIG. 1 has been designed to have improved efficiencies, specifically for the purposes of this invention, as will be described.

The arrangement shown also serves to raise one end of the manifold 10 so as to tilt the boiler within it for the collection of steam at that end at a boiler angle B. Depending upon the particular shape of the boiler, which is here assumed to be more or less longitudinal, for example one or more straight copper or stainless steel pipes, angle B will be kept as small as possible while achieving adequate steam collection. The objective is to keep the collector tubes 12 as upright as possible, after providing for angles A and B.

Angle B can be as low as 10 degrees, with from 10 to 30 degrees being reasonably practicable. It will be appreciated that a more complex manifold and boiler design can allow for the tubes 12 to be upright in the sense of angle B, if the boiler is non-linear and has means to provide for steam collection. (That is, angle B is zero, but they are canted back at angle A.) For example, the upper hot manifold chamber, or even the boiler itself could have a generally triangular shape, mimicking that shown for the ramp 20, so that the bottoms of the collector tubes 12 are horizontally aligned and ramp 20 is not necessary.

Alternatively, the manifold 10 and internal boiler can be substantially longitudinal or rectilinear in the boiler direction, canted and tilted or elevated at angles A and B, as shown in FIG. 1, and the collector tubes can depend vertically from the manifold 10, vertically in a plane perpendicular to the collector panel 18, that is. In this case the manifold, and possibly its internal boiler are adapted to receive the hot upper ends of the collector tubes 12 at an appropriate angle, being for example provided with tube sockets angled to the boiler direction rather than perpendicular thereto. Such a construction requires more elaborate members and is therefore more expensive.

Figure 1A:
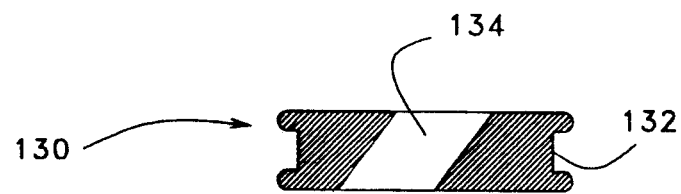
FIG. 1A is a cross-section through a hollow plug usable in a modification of the embodiment of FIG. 1.

FIG. 1A shows, in section a hollow plug or grommet 130 that can be used to seal a collector tube 12 in a wall of the manifold 10 while allowing the collector tube 12 to project from the manifold 10 in a non-perpendicular manner. The plug 130 is constructed of a resilient material and has an external recess 132 to lock on the wall of an opening in the manifold wall and a transverse bore 134 which is a tight, sealing fit on a delivery tube and is disposed at an angle to the axis of the plug 130. This angle can be varied to vary the disposition of the collector tubes 12. A fan-shaped array of collector tubes 12, which is space economical and employs a compact manifold can be provided by appropriate selection of the tube angle, if desired, with an arcuate-shaped manifold 10.

The operation of the solar-powered steam-generator system shown in FIG. 1 is similar to that described in the WorldWater text: However, the heat exchange system between the collector tubes 12 and the boiler 32 and the air-flow means are improved for improved steam-generating efficiency. In principle, cold water delivered to the boiler in manifold 10 from supply pipe 14 is heated by hot fluid flowing in the delivery tubes 30 to raise steam which rises in the boiler 30 to exit, and be applied to useful work, via steam pipe 16. With particular advantage for the pumping of ground water, the steam head raised is applied to drive a diaphragm pump, which as disclosed in the WorldWater text, operates surprisingly efficiently.

The solar-powered steam generator system described and shown with reference to FIG. 1 is designed to promote air flow by natural draft, reducing stalling and the need for supplemental forced air circulation, for example by a fan. Such a device introduces undesired complexities into the system, including moving parts and maintenance requirements, and requires means to energize or power it. While a circulation fan could conceivably be powered by tapping off raised steam, this will reduce valuable steam delivery.

The collector tubes 12 are carefully disposed so that heated air moving within the tubes can move in an upward direction towards the manifold to take advantage of the natural tendency for hot air to rise and of cold air to fall, thereby to help move the heat delivery fluid in the tubes and thus improve the delivery of heat to the boiler. Neither Moan nor WorldWater considers or suggests any such disposition of the collector tubes to employ gravity to promote air flow, and indeed both teach a horizontal disposition for the collector tubes. Both Moan and WorldWater employ a staggered double array of collector tubes arranged on opposite sides of a manifold which cannot be arranged with all the collector tubes allowing fully heated air to move upwards, towards the manifold, because the two arrays oppose each other with opposite flow streams, so that should those on one side of the manifold be hypothetically disposed in a favorable manner, then those on the opposite side of the manifold will not. In FIG. 1 herein, all the collector tubes 12 are disposed to deliver hot air upwardly to the manifold.

In the present invention, the delivery tubes 30 within the collector tubes 12 define an outer annular airway for the descent of cool air and an inner airway within the delivery tubes 30, themselves, for the ascent of warm air although, depending upon the internal manifold construction, this flow can be reversed, as will be described in connection with FIG. 6. Cool air flows down the outer annular airway in each collector tube 12, being warmed as it descends and becoming substantially hotter in the vicinity of the lower end of the collector 12 where it turns and rises within the delivery tube 30. Now that it is hot, significant convection forces drive the air upwardly. As the hot air rises, it is insulated from the possibly cold or cooled outer walls of the collector tubes 12 by the outer airway of descending warmed air surrounding the delivery tube 30.

The present invention, as embodied in FIG. 1, is further distinguished from Moan and WorldWater by the nature of the air flow, if such is employed. In a preferred embodiment the boiler is within or adjacent to the manifold 10 and in close airflow communication therewith. Further, in this preferred embodiment, the boiler is equipped with heat exchange means, for example, collector vanes, and is disposed to receive heated air from the delivery tubes 30 on an upper side and to discharge cooled air, its heat having been drawn into the boiler, from a lower side, thus employing the natural tendency of cool air to drop to enhance natural draft air flow. The thus-disposed boiler or heat exchanger can be connected in series air circuit with the upper ends of the collector tubes 12, preferably by directing and baffling or otherwise ducting air from the raised upper ends of the delivery tubes 30 to discharge into the upper side of the boiler and directing and baffling or otherwise ducting air from the under side of the boiler to the relatively lower, upper ends of the collector tubes 12.

The manifold 10 and boiler are thus constructed, disposed and adapted to operate to employ natural convective forces to boost circulation of the heat transport fluid, that is, to assist the flow of fluid in the collector tubes 12 and the delivery pipes 30.

While the boiler 32 is shown extending effectively the whole length of the manifold 10, it could in an extended manifold construction accommodating a large array of collector tubes, be positioned more towards one end of the manifold, with means, such as baffles and suitable ducting being provided within the manifold to collect heated fluid from the other end of the manifold 10 and deliver to the end-wise situated boiler 32.

Air can thus cycle down the collector tube 12, up the delivery tube 30, transversely across the manifold 10, if necessary, and downwardly through the boiler and across back to the collector tube 12 with gravity, or convection, naturally assisting the flow through much of the cycle and especially on the upward and downward strands which are free of any opposition between the desired flow direction and the preferred direction of natural draft convective flow.

Moan and WorldWater also teach lengthwise movement of air through the manifold 10, which appears to relate to the staggered double collector array construction which is characteristic of their systems, and to the particular aims of Moan which apparently are concerned with outputting a flow of hot air.

By contrast with Moan, the present invention is, as is WorldWater, concerned with generating a head of steam for pumping water, and hot air flow, if utilized, can be cycled within the steam-raising system. Indeed, the manifold 10 and boiler within can be compartmentalized transversely of their length to divide the air flow and contain lateral perturbations. Lengthwise heat transmission can be effected by steam bubbles rising in the boiler.

In a preferred embodiment, the invention further comprises self-contained transverse heat-exchanger elements or hot boxes to cycle air back and forth with one, or a small number not exceeding six, of the collector tubes 12. As shown herein, the hot boxes do not exchanging air with adjacent collector tubes 12 not connected to the same hot box. In this manner air flows substantially in a number of closed loops configured generally in a plane transverse to the direction of the boiler lying between the water pipe 14 and the steam delivery tube 16. A number of such heat-exchanger air flow loops can be disposed side-by-side along the boiler. The present invention envisages that adequate temperature gradients for continuous steam-raising can be established and maintained with self-contained, substantially closed-circuit loops. However if higher, more localized temperature gradients are required, means can be provided to connect these loops, or some of them, one to another, in series so that the hot output of one becomes the cold input for the next. Adequate insulation to attenuate heat losses to tolerable levels should also be provided.

This approach is well adapted to exploit the advantages of modularity. Using individual self-contained collector elements 12, the provision of modular heat exchanger elements permits a flexible manufacturing program where solar-powered steam generators of various capacities can readily be provided by adding collector tubes 12 and heat-exchanger elements as necessary. Although the boiler could be similarly modular, a more economical system uses copper or stainless steel pipe for the boiler tubes and cuts them to the full length of the boiler 32, and then fits the hot boxes around the boiler tubes. Similarly, the housing of the manifold 10 could be modular, with or without insulation, but better economy results from building a simple manifold housing to the desired size. Modularizing the heat exchangers and associated airways as described in the two embodiments shown in FIGS. 2 to 5 avoids the need to provide a range of expensive assemblies to meet different capacity requirements.

Figure 3:
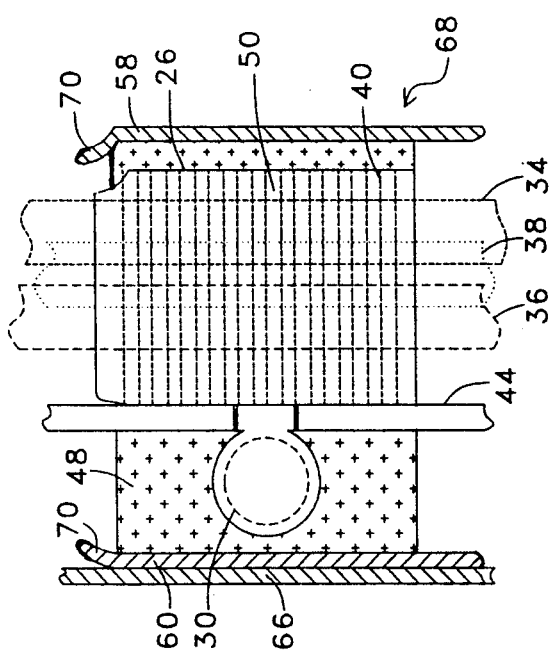
FIG. 3 of the drawings is a horizontal sectional view on the line 3—3 of FIG. 2.
Figure 2:
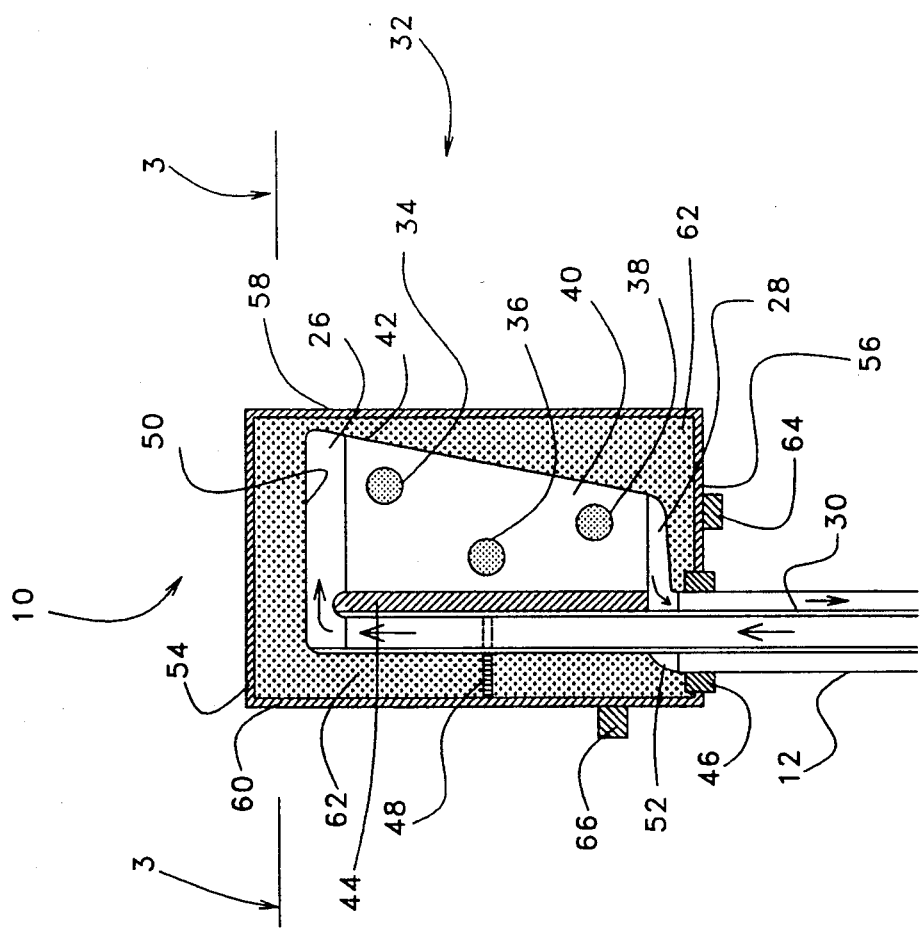
FIG. 2 of the drawings is a vertical sectional view of one embodiment of a modular heat-exchanger element or manifold block which can be used in the steam generator of FIG. 1.

In the embodiment of FIGS. 2 and 3 a boiler indicated generally at 32 comprises three boiler pipes, an upper boiler pipe 34, a middle boiler pipe 36 and a lower boiler pipe 38, connected by appropriate steam-technology plumbing with water supply tube 14 and steam tube 16. The boiler 32 further comprises suitable heat exchanger means to draw heat from hot air which can for example comprise metallic vanes 40. The boiler 32, with its heat exchanger vanes 40 is contained between an inner longitudinal side wall 42 and an outer longitudinal side wall 44 which converge downwardly to funnel air descending over the boiler 32.

A collector tube 12 is sealed into the base of the manifold 10 by a grommet 46 while inner delivery tube 30 emerges upwardly into the manifold 10 where it is supported against the inner side wall 42 by an insulated spacer 48. One or more spacers 48 for each delivery tube 12 can serve also to support the inner wall 44, and other internal components of the manifold 10. Additional support means can be provided in ways that will be clear to a skilled mechanic.

The delivery tube 30 opens into hot upper chamber 26 which extends across the top of the boiler 32 with a smoothly contoured roof 50 to guide hot air rising out of the delivery tube 30 into the boiler 32. Underneath the boiler 32 cool chamber 28 collects cooled air descending off the heat exchanger constituted by the vanes 40 and the boiler pipes 34–38 and delivers it downwardly into the collector tubes 12. Cool chamber 28 extends across the bottom of the boiler 32 so that the boiler is effectively enclosed and cool chamber 28 is also smoothly contoured the better to guide the air flow.

The vanes 40 can be much like the fins of common tube and fin heat exchangers, particularly the bendable aluminum vanes that are used for household baseboard hot-water heating elements. These are often provided with central transversely projecting tangs that engage the hot-water pipe and are clamped thereon by a similar adjacent vane. The vanes 40 can be quite closely spaced consistently with permitting adequate air flow and may be angled relative to the boiler pipes 34 to 36 so that each lies more or less in a vertical plane. This disposition is favorable for low air flow resistance. Where or when air flow is good the vanes 40 may have a waved vertical cross-section or be otherwise contoured or deformed to promote heat transfer.

The chambers 26 and 28 can be either continuous or modular and can be adapted to have openings into which delivery tubes 30 or collector tubes 12, respectively, can be plugged, with seals, as necessary. Thus, as shown, the lower part of chamber 28 is formed with annular passageways through which the collector tubes 30 can pass and which provide caps 52 that can fit over the collector tubes 12.

The various air ways are preferably substantially air tight, being provided with seals as necessary, although a controlled small amount of air communication with the atmosphere may be desirable to assist air flow, as will be described in more detail hereinafter.

It will be understood that the cross-sectional shapes of the chambers 26 and 28 can modified to a shape which gives improved aerodynamic flow, for example by rounding the roof 50. In general, any design details that enhance movement of air through the system are favored so long as they mitigate against the formation of stagnancy and hot spots in the collector tubes 12 or the delivery tubes 30.

The manifold 10 can be constructed as a simple rectangular box with top and bottom walls 54 and 56 and front and rear walls 58 and 60 which box is stuffed with bulk insulation 62. Alternatively, it can be constructed with insulated walls for example, as shown in Moan. Appropriate supports, such as frame members 64 and 66 are provided, as necessary. Bottom wall 56 is apertured to admit the collector tubes 12. Preferably front wall 58 has a black, exterior surface to absorb solar radiation, while the external surfaces of the other three walls 54, 56 and 62, which will receive little, if any direct sun are white or bare-metal to reduce radiative losses.

Modularity is apparent from FIG. 3 where the manifold walls can be seen to be formed as interfitting manifold elements by crimping them inwardly towards each other as at 70 so that they will nest snugly one within the next. With a non-horizontal manifold 10 the crimping should be directed upwardly to discourage water ingress. The hot and cold air chambers can be similarly formed to interfit snugly, with sealing means if necessary, for example as shown at 72 for the upper hot chamber 26.

Such modularity, enabling different capacity systems to be produced economically and facilitating maintenance, can, if desired be extended to the boiler elements, notably the pipes 34 to 38 and the inner and outer walls 42 and 44 but, at least for the boiler pipes, it is probably not economical to modularize.

As shown the air chambers 26 and 28 of the modular manifold element 68 are open to communicate with those of adjacent elements, and for stability of a multi-element manifold, the inner wall 44 is preferably a continuous support wall on which the manifold elements are threaded during assembly. This structure implies a lightweight closing wall (not shown) across the inside ends of the vanes 40 to lie against the inner wall 44 and assist assembly and air sealing. This might also be crimped to nest with an adjacent inner closing wall, as suggested at 74.

In an alternative construction which provides better air sealing, easier assembly and improved reliability, the airways of an individual element 68 are built as a substantially closed circuit system, end walls being provided to close off the air chambers 26 and 28, a further end wall, or a vane 40 itself serving to close the ends of the boiler 32. The walls of such an element can be molded from a temperature resistant plastic, for example Lexan, registered trade mark, General Electric Co.

These modular designs of manifold elements while providing particular benefits when employed with the manifold and collector tube designs of this invention can also be applied to the more complex manifold layouts disclose in Moan and WorldWater.

Hot air rising up delivery tubes 30 flows into hot chamber 26 where it spreads out and slows down, then percolates over the boiler tubes 34 to 38 and the vanes 40, giving up its heat to the boiler pipes 34 to 38 to raise steam therein. Cooled air descends into lower cool chamber 28 beneath the boiler 32, through caps 52 into the collector tubes 12. As air descends through the boiler 32 it contracts and accelerates downwardly, assisted by the funnel shape of the heat-exchanger chamber defined between the walls 42 and 44. This action helps pump the air circulation and is of value in assisting the movement up and down the tubes 12 and 30.

Using a multiple pipe boiler system, for example with three tubes as shown, the pipes can be connected in a serpentine manner to sequence upwardly complementing the downward air temperature gradient of the air in the boiler 32.

In constructing those elements of the system having surfaces that define airways or contact useful moving air flows it is desirable to reduce air flow impedance to a minimum by streamlining or sculpting these surfaces to reduce turbulence and moderate directional changes. The internal air-contacting surfaces are preferably smooth and may be finished, to a degree dictated by economics, by polishing or with a low-friction coating such as polytetrafluorethylene. Curves or turns where the airways change direction are preferably moderated to be as gradual or constantly curved as other constructional constraints permit. Sharp changes of direction should be minimized. Because the air flow is driven by modest pressure differences, attention to these details is important in preventing stalls, maintaining air flow and optimizing heat delivery to the boiler. All these steps are valuable in obviating the need for a circulating fan and its attendant complications and in providing an efficient solar-powered steam generation system where all the air flow is driven by natural convection.

Figure 4:
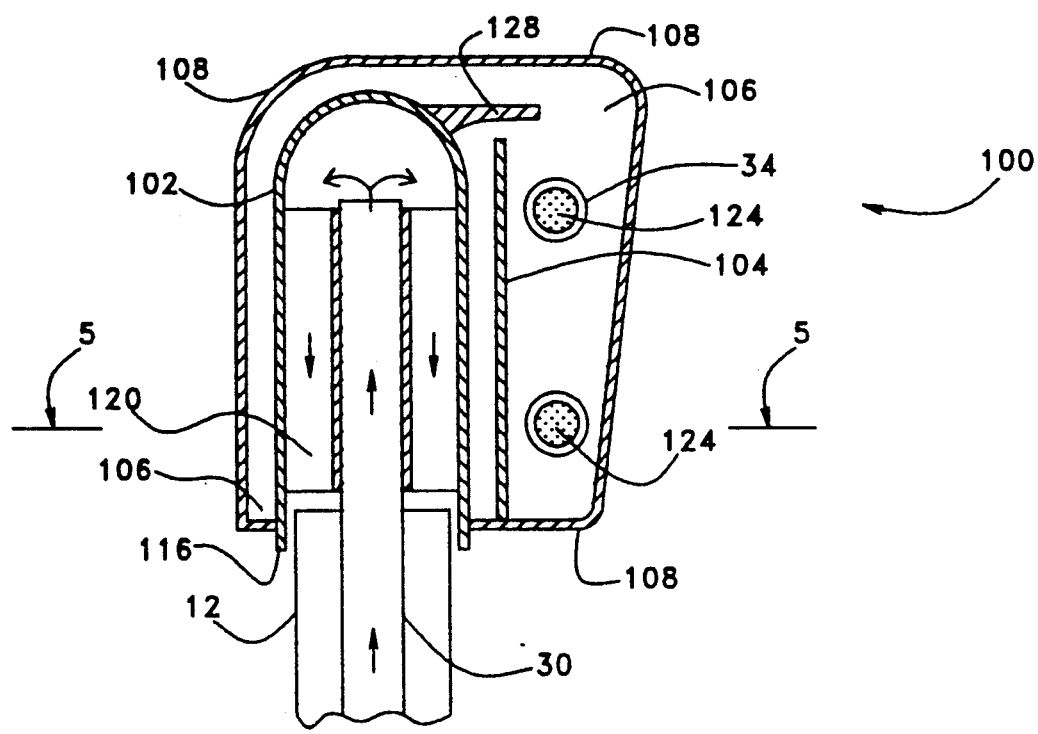
FIG. 4 of the drawings is a vertical sectional view of another embodiment of a heat exchanger element or manifold block that can be used in the steam generator of FIG. 1.
Figure 5:
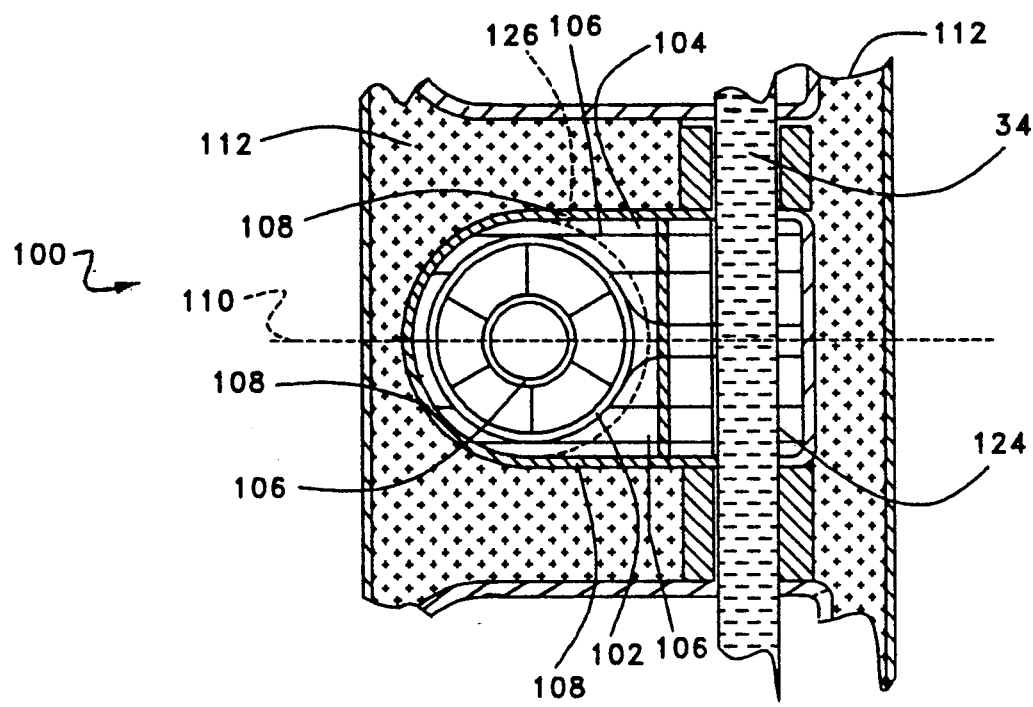
FIG. 5 of the drawings is a horizontal sectional view on the line 5—5 of the heat exchanger element of FIG. 4 shown with parts of adjacent similar elements shown in broken lines.

The embodiment of FIGS. 4 and 5 provides a novel heat exchanger box 100 having an internal, deep socket which fits over the end of and provides an end cap 102 for a collector tube 12. The heat exchanger box 100 is a further example of how the construction of the solar-powered steam generator of this invention can be modularized. The box 100 has a blocky shape, with a nearly rectangular vertical overall section the corners of which are rounded and a horizontal sectional shape in the form of a rectangle cut semicircular at one end and also having rounded corners at the other.

The heat exchanger box 100 is more or less divided into two compartments by a central vertically extending baffle 104. The end cap 102 is on the lefthand side of the baffle 102 as shown in FIG. 4 while the boiler tubes 34 (two tubes 34 shown) pass through the righthand side of the heat exchanger box 100. Transverse vanes 106 draw heat from the end cap 102 to the boiler tubes 34 and define passageways for air or other vapor to recirculate and also transmit heat.

As shown the heat exchanger box 100 has a single skin 108 and this can be molded out of a temperature-resistant plastic, preferably a heat-insulative plastic material such as a thermosetting resin. Though not shown, the molding can be molded in two interfitting or interlocking halves divided, for example along a vertical plane of symmetry in the plane of the paper in FIG. 4 and along the symmetry line 110 of FIG. 5. These two halves can snap together and such a divided construction can facilitate assembly of a number of heat exchanger boxes 100 with the boiler pipes 34 and with a corresponding number of collector tubes 12. Thus, one half of the box 100 may be threaded on the boiler tubes 34, then a collector tube can be positioned, with appropriate support and finally the second half of the box 100 is snapped into place, clamping around the collector tube.

For better insulation the heat exchanger box 100 can be double-skinned. However, with adequate packing of quality insulation 112 within manifold walls 114, such double-skinning serves little purpose. The described structure for the heat exchanger box 100 is light in weight yet robust.

The end cap 102 substantially or completely closes off a collector tube 12 extending over the delivery tube 30 to guide and deflect warm air or vapor rising up the delivery tube 30 downwards into its enclosing collector tube 12. In this way the heat transfer medium or fluid which is primarily envisaged as being a vapor or air, recirculates in a closed system more or less within a delivery tube 12. Although complete closure of this system appears to be a preferred operating means during normal output, some venting may be desirable to prime the flow at start up or during periods of low solar radiation.

The end cap 102 has a tubular sleeve portion which is a snug or tight fit at its lower end 116 over the collector tube 12. This connection can also be sealed by various sealing rings, or the cap 102 could be formed integrally with the collector tube 112. Clearly, several variations of this construction are possible within the spirit of this invention. The walls 118, at least of the sleeve portion are heat conductive, formed of aluminum for example, and within the cap are a plurality of radial vanes 120 extending from an arbor 122 which is a close fit over the delivery tube 30. The structure comprised by the walls 118, the vanes 120 and the arbor 122 constitutes an efficient heat collection device to take heat from air in the collector tube 12 and transfer it to the heat-exchanger box 100 and then to the boiler pipes 34 to 38. These components are metallic for heat conductivity. Although brass is a possible metal, aluminum, or an alloy thereof, is preferred.

The right-hand side of the heat exchanger box 100 has front-to-rear openings to receive the boiler tubes 34 and these openings are lined with a closely engaging heat-conductive sleeve 124 to transmit heat thereto. Transverse vanes 106 preferably substantially fill the transverse section of the heat exchanger box 100 shown in FIG. 4 extending from the end cap 102 to the boiler pipes 34 to 38 in as short a run as is practicable.

Preferably the vanes 106 serve both to conduct heat and also to define laminar air-flow pathways for convective heat transfer, whereby heat rising from the hot end cap 102 can circulate across the top of the baffle 34, down over the boiler tubes 34 and back across the bottom of the heat exchanger box 100 to be drawn over the hot end cap 102 and recirculate. To permit and promote this circulation, the baffle 104 extends vertically substantially parallel to the end cap 102, although it could incline towards the top of the end cap 102 to provide a chimney effect, and is provided with a cutout 128 at its base to permit air return beneath it. The upper end of the baffle 104 terminates well short of the roof of the heat exchanger box 100 and a transverse baffle 128 extends from the end cap 102 to divide the transverse flow in two and reduce air flow perturbations, noting that streamline air flow is desirable for the purposes of this invention which are generally concerned with providing improvements in air flow to enhance heat transfer. The baffle 104 can have an inverted comb construction with teeth between the vanes 106 and a spine running beneath them, or in a cutout in the lower edge of the vanes 106.

The broken line 126, FIG. 5 indicates how the baffle 104 can be extended into a three-dimensional structure embracing the end cap 102, the better to constrain the air flow and avoid dead spots. In this variation, the modified baffle 106 fills or encloses the space between the broken line 126 and the planar, unmodified baffle 106.

Baffle 106 is preferably at least somewhat insulative, and good insulation is helpful in concentrating heat delivery at the boiler tubes 34.

As shown in FIG. 5 the vanes 106 are disposed side-by-side along the pipes within the heat exchanger box 100 and some of them may be pressed into the curved profile of the end cap 102 the better to transfer heat therefrom. The particular shape and construction of the vanes 106 may be modified in a number of ways within the spirit of fulfilling the objective of moving heat from the end cap 102 to the boiler pipes 34. For example, the drawings are intended to depict the vanes 106 as extending generally perpendicularly to the boiler tubes 34 in a planar manner. However, where the boiler tubes are inclined, for example as shown and described in relation to FIG. 1, the vanes 106 can be angled to give the air pathways between them a vertical disposition so as to maximize natural convective effects. Given that thin aluminum sheets, again as are commonly found providing heat-dispersing vanes on domestic baseboard heating systems, are readily shaped, more complex profiles are readily attainable. For example a sinuous profile in the vicinity of the boiler pipes 34 can slow the air flow, if it is otherwise adequate, to provide better heat transfer to the boiler tubes 34.

While the heat exchanger box 100 could in theory be solid metal between the end cap 102 and the boiler pipes 34, this is not a preferred construction.

Hot air from the delivery tubes 30, assuming an array of a plurality of such tubes and heat exchanger blocks, is turned by the domed top of the end cap 102 and is cooled by radial vanes 120 extracting the heat therefrom and drawing the flow downwardly by convection. Thus, air or vapor cycling in the collector tube 12 and the delivery tube 30 is pumped by the convective rise of hot air in the delivery tube 30 combining with the drawdown through the radial vanes 120 which also help guide and control the airflow, reducing undesired perturbations, and opposing the tendency of descending air in the outer annular space of the collector tube 12 defined by the delivery tube 30, to rise as it is heated.

Hot air rising off the cap 102 is well channeled and guided in a smooth flow path across the top of the heat exchanger box 100 where it is delivered over the boiler tubes 34 and drawn down past them cooling as it drops, the drawdown being enhanced by funneling between the baffle 106 and the side skin 108 of the heat exchanger box 100. Air flow is thus naturally pumped by convective forces in both vertical stages of the cycle. While The heat exchanger box 100 can be closed, and indeed sealed, air bleed holes (not shown) top and bottom may help prime or initiate the air flow. In a more elaborate construction, small thermostatically controlled slides can close the bleed holes when an adequate temperature is reached, re-opening them at a low temperatures, possibly only at start-up, in the morning.

Most of the modifications and variations described for the embodiment of FIGS. 2 and 3 will be applicable to this embodiment, especially those concerning surface finish and curvatures to enhance air flow. Also, with a plurality of series-connected runs 34, the boiler can feed cool water upwardly to be in concert with the temperature of the descending air.

Figure 6:
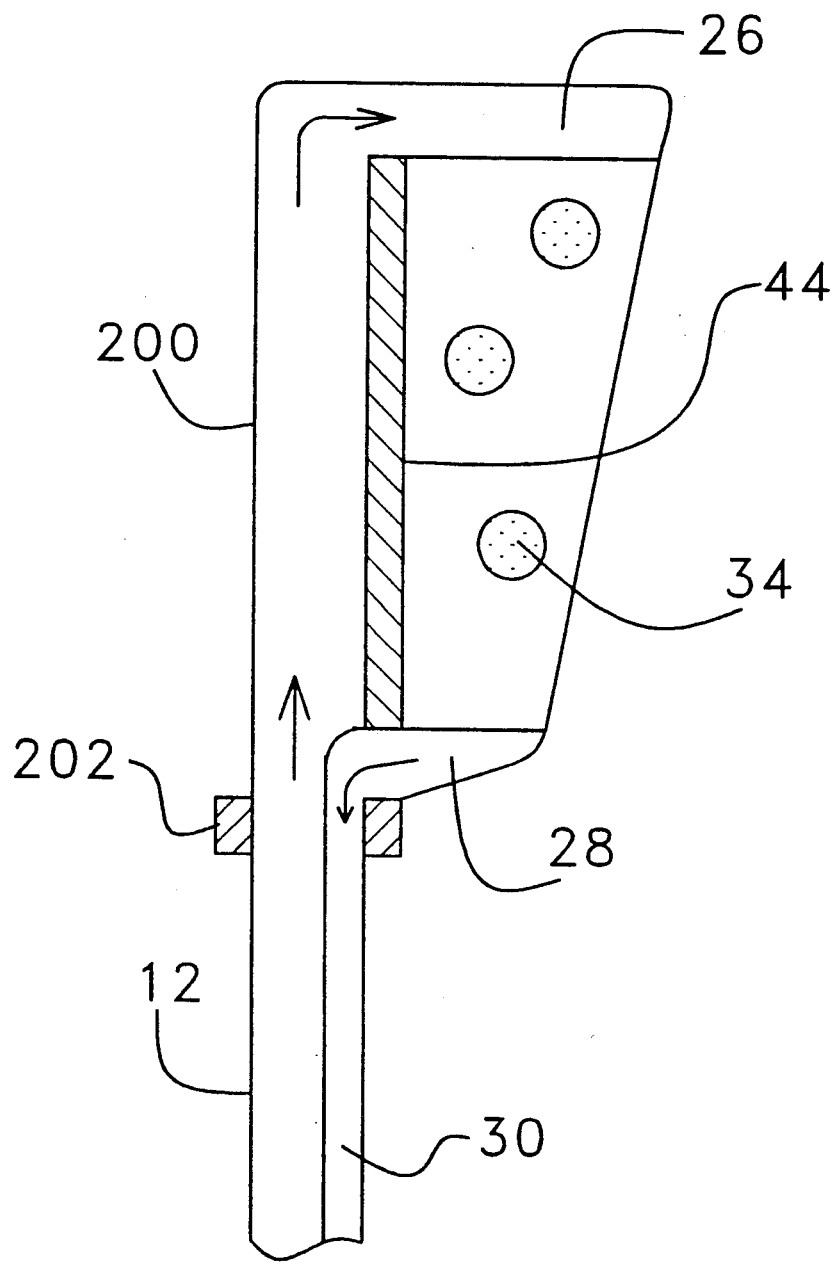
FIG. 6 is a partial view similar to FIG. 2 of another embodiment of the invention.

FIG. 6 shows a modification having several advantages. In this embodiment which is generally similar to that shown in FIGS. 2 and 3, air flow in the tubes 12 and 30 is reversed and delivery tube 30 is positioned to lie against one side of the collector tube 12. A tubular extension 200 carries warm air from a collector tube 12 up to the top of the baffle 40 to flow over the boiler tubes 34 and be drawn downwardly as it cools. The extension 200 is sealed to the top of a collector tube 12 and ported to admit a delivery tube 30 through its sidewall. The delivery tube 30 thus connects with the lower air chamber 28 on the underside of the boiler tubes 34 to receive cool air and deliver cool air downwardly to the lower ends of the collector tubes 12.

This construction takes full advantage of natural convection while suffering minimal opposing convective forces. Cooled air drops naturally down delivery tube 30. As it drops it is warmed somewhat by conduction through the walls of the tube 30 from the heated air in the collector tubes 12, mildly opposing the descent. This effect can be reduced by using an insulative material, for example fiber glass for the delivery tube 30. In contrast, air flow in the outer collector tube 12 is most favorable because the cool air emerging from the bottom of the delivery tube 30 is heated progressively, getting hotter and hotter as it rises, accelerating its flow. Furthermore, all the air is delivered quickly to the boiler once it has reached its highest temperature at the top of the tube, without suffering cooling from passing over surfaces cooled by countercurrents. These features improve the efficiency of the delivery of heat to the boiler tubes 34 from the sun.

This effect is not exploited by WorldWater or Moan.

The profile of the embodiments of FIGS. 2 to 6 perpendicular to the plane of the paper can, referring to the interior air-flow chambers of the manifold 10, be generally rectangular with rounded corners, or indeed have a substantially curved profile.

It will be clear, especially from the broken lines, that the invention contemplates a plurality of hot boxes or manifold elements assembled side-by-side along the boiler 32 or within the manifold box 10, with insulated spacers, such as 125 between them.

With the delivery tube 30 disposed eccentrically within the collector tube 12, for example lying with at least its outlet end, or its whole length, against the wall of the collector tube 12, the delivery tube should be disposed to be on that side of the collector tube which is remote from the sun, so that it does not obstruct or shade hot surfaces. Surprisingly, this is easily and automatically achieved by giving the delivery tubes 30 transverse freedom of movement within collector tubes 12, for example by mounting them swingably at their upper ends. Then, as the collector tubes 12 are set up for use, facing the sun, the delivery tubes 30 will fall away from the sun to a preferred position lying against the lower wall of the collector tube 12.

Alternatively, they can, as shown in FIG. 6, be fixedly mounted along a side of the collector tube 12 that will be remote from the sun, in use. Again, in the FIG. 6 arrangement, the boiler tubes are disposed away from the sun to avoid shading the upper ends of the collector tubes 12.

This feature of eccentrically disposing the delivery tubes by fixed design, or by free mounting to take advantage of gravity, is of general application and can be advantageously applied to the constructions of Moan or WorldWater, noting that Moan's teaching of tabs 68 at the ends of the delivery tubes to dispose the delivery tubes coaxially within the collector tubes 12, is a contra-indication against adopting this helpful design. The collector tubes are preferably of sophisticated solar-energy collecting construction, for example like those used by Moan which are evacuated double-walled glass tubes in which the outer surface of the inner wall has a selectively absorbent, generally black coating. Several suitable coatings are described in Moan and others will be known to those skilled in the art.

The steam output from steam tube 16 can be applied to any useful purpose that can utilize rather low pressure steam. WorldWater discloses a steam circuit which collects steam raised in the boiler 32 in a steam drum and applies the steam to a diaphragm pump which can be used to raise ground water from a well and can supply a surprisingly adequate and steady delivery of water for household, industrial or irrigation purposes.

A steam return line from the diaphragm pump goes to a condenser and means are provided to charge the steam boiler, which is pressurized by the rising steam, with water from the pump.

The improved steam generating system of this invention can, with advantage, be applied to such a steam-driven water-pumping system. Obviously steam management is a very well-developed art and various means can be applied to facilitate the supply of water to the boiler 32. For example, a reciprocating slide valve can be used to drop water into the steam drum. Such a slide valve can be driven either by steam or by water pressure.

Noting that steam output may peak and be more than adequate to drive the pump at midday, a steam accumulator can be provided to trap and store higher pressure steam which can then be used in a variety of ways. The stored steam may be used to drive the pump at times of low solar output or to help apply water to the boiler, for example by equalizing the pressure in a water tank and permitting gravity feed from the water tank to the boiler, or to drive aforesaid steam valve.

The system is generally designed to operate with low pressure air flow, to generate low pressure steam, to optimize energy utilization and to provide a "low technology", low cost, low maintenance system suitable for remote and poor areas. This means that little steam pressure is available for driving ancillary apparatus and further that energy should be carefully conserved throughout.

The invention provides useful improvements in a significant emerging technology. Steam-raising solar-powered water pumps offer excellent promise for providing practical relief for the dreadful problems of the poorest parts of the world. Hot vapor convection appears to be an excellent solution to the problem of concentrating solar radiation, transferring heat from dispersed zones to a central steam-raising zone, and this invention provides some helpful improvements in the efficiency with which this transfer can be effected and the equipment can be supplied.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A solar-powered steam-generation system comprising:
   a) an array of solar-energy collector tubes each extending from one of a plurality of dispersed solar-energy absorption zones to an energy collection center to direct a flow of solar-heated fluid from said zone to said center;
   b) a steam-raising boiler driven by heat from said flows of solar-heated fluid;
   c) heat-conductive water-conduit means in said boiler having external heat-exchange surfaces exposed to air;
   d) manifold means at said energy-collection center to receive and collect said flows of solar-heated fluid and transfer heat therefrom to the boiler said collector tubes each extending into said manifold means and being supported by said manifold means to guide the respective flow of solar-heated fluid to the manifold, and
   e) hot air-flow passageways extending between said collector tubes and said heat-exchange surfaces of said water-conduit means;
wherein said manifold means includes one or more interfitting manifold blocks each being directly connectable one to the other and each adapted to support one or more collector tubes and channel solar-heated air to the boiler.

2. A solar-powered steam-generation system according to claim 1 wherein said heat-conductive water conduit means is disposed substantially within said manifold means to receive heat from said solar-heated fluid flows for boiling water in said water conduit means.

3. A solar-powered steam-generation system comprising:
   a) an array of solar-energy collector tubes each extending from one of a plurality of dispersed solar-energy absorption zones to an energy collection center to direct a flow of solar-heated fluid from said zone to said center;
   b) a steam-raising boiler driven by heat from said flows of solar-heated fluid;
   c) heat-conductive water-conduit means in said boiler having external heat-exchange surfaces exposed to air;
   d) manifold means at said energy-collection center to receive and collect said flows of solar-heated fluid and transfer heat therefrom to the boiler said collector tubes each extending into said manifold means and being supported by said manifold means to guide the respective flow of solar-heated fluid to the manifold; and
   e) hot air-flow passageways extending between said collector tubes and said heat-exchange surfaces of said water-conduit means;

wherein each manifold means is elongated and extends in a horizontal direction and said collector tubes are disposed along said elongated manifold means in said horizontal direction and extend transversely thereof in a vertical direction for upward flow of heated fluid therein said manifold and said water conduit means further being inclined upwardly to enable steam generated in said water-conduit means to rise towards one end of the manifold.

4. A solar-powered steam-generation system according to claim 3 wherein said collector tubes open into said hot air flow passageways in said manifold means, said solar-heated fluid is air whereby said heated air can circulate from said tubes to said manifold means and substantially all said collector tubes are disposed to depend downwardly from said manifold means whereby natural convection promotes the delivery of heated fluid towards the boiler by causing said heated air to rise upwardly in the tubes.

5. A solar-powered steam-generation system comprising:
   a) an array of solar-energy collector means adapted to provide a directed flow of solar-heated fluid from dispersed solar-energy absorption zones to an energy collection center;
   b) a steam-raising boiler driven by heat from said directed fluid flows;
   c) manifold means at said energy-collection center to receive and collect said heated fluid flows and transfer heat therefrom to the boiler; and wherein heated air recirculates in said manifold means to deliver heat from said fluid flows to said boiler and wherein the system further comprises passively acting airflow-enhancing structures to promote natural convective air flow.

6. A solar-powered steam-generation system according to claim 5 wherein said heated fluid flow and said air flow are driven by natural convection without intervention from energy consuming powered air-flow generating devices.

7. A solar-powered steam-generation system according to claim 5 wherein said collector means comprises a plurality of collector tubes, each having an open-ended delivery tube therein, both said tubes opening into said manifold and said heated fluid comprises air recirculating through said tubes and said manifold, and wherein said delivery tube is swingably mounted at the manifold end thereof so as to lie away from the sun within said collector tube when mounted for use.

8. A solar-powered steam-generation system according to claim 5 wherein said airflow-enhancing structures comprise shaping of internal surfaces to promote streamline air flow.

9. A solar-powered steam-generation system according to claim 5 wherein said airflow-enhancing structures comprise air vent means openable to atmosphere to prime the air flow.

10. A solar-powered steam-generation system comprising:
   a) an array of solar-energy collector tubes each extending from one of a plurality of dispersed solar-energy absorption zones to an energy collection center to direct a flow of solar-heated fluid from said zone to said center;
   b) a steam-raising boiler driven by heat from said flows of solar-heated fluid;
   c) heat-conductive water-conduit means in said boiler having external heat-exchange surfaces exposed to air;
   d) manifold means at said energy-collection center to receive and collect said flows of solar-heated fluid and transfer heat therefrom to the boiler;
   e) hot air-flow passageways extending between said collector tubes and said heat-exchange surfaces of said water-conduit means;
   f) a hot air chamber above said heat-exchange surfaces of said water conduit means; and
   g) a cold air chamber below said heat exchanger surfaces;

wherein said hot air-flow passageways communicate with said hot air chamber prior to said heat-exchange surfaces to admit heated air to said hot air chamber prior to contact with said heat-exchange surfaces and said hot air-flow passageways further communicate with said cold air chamber to return cooled air therefrom to said collector tubes whereby said heated air has a flow path directing substantially all the air downwardly over said heat exchanger from said hot air chamber to said cold air chamber and cooling in said heat exchanger serves to draw the air downwardly to promote convective flow.

11. A solar-powered steam generation system according to claim 10 wherein heated air recirculates in said manifold means to deliver heat from said fluid flows to said heat exchanger surfaces and wherein the manifold and heat-exchanger means provide a flow path in which substantially all said recirculating air is directed downwardly over said heat exchanger surfaces from said hot air chamber to said cold air chamber.

12. A solar-powered steam generation system according to claim 1 wherein said manifold means extends generally horizontally with a small upward tilt to promote steam collection and all said collector tubes depend downwardly from said manifold means and each collector tube includes a delivery tube within the collector tube which delivery tube has an open end downwardly of the collector tube said collector tubes being connected to one of said hot and cold air chambers and said delivery tubes being connected to the other of said air chambers so that said flow path of said recirculating air extends in parallel through said collector tubes and in parallel through said delivery tubes.

* * * * *